No. 805,268. PATENTED NOV. 21, 1905.
W. T. DONNELLY.
MARINE TRANSPORTATION UNIT.
APPLICATION FILED SEPT. 19, 1905.
4 SHEETS—SHEET 2.
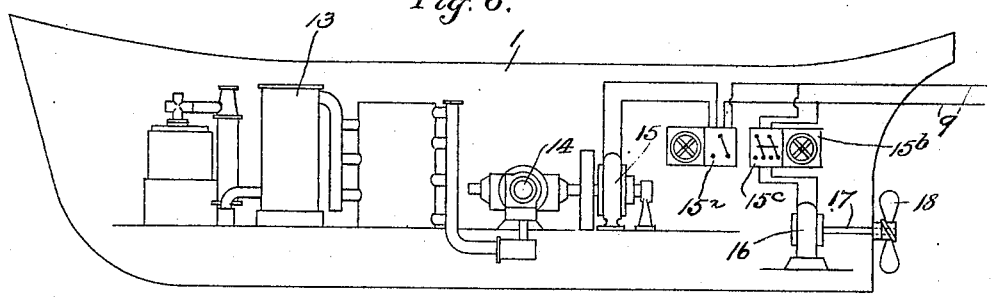
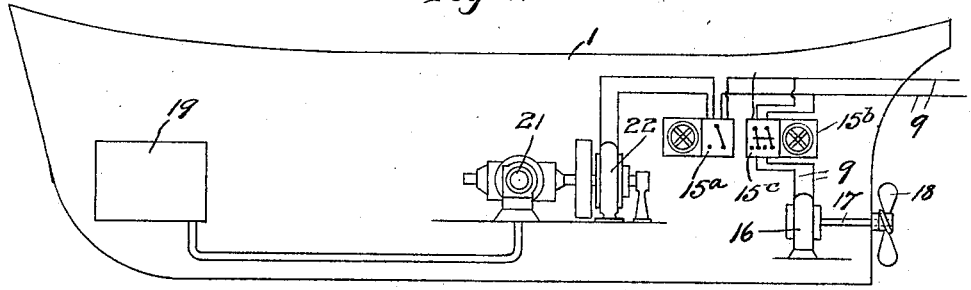
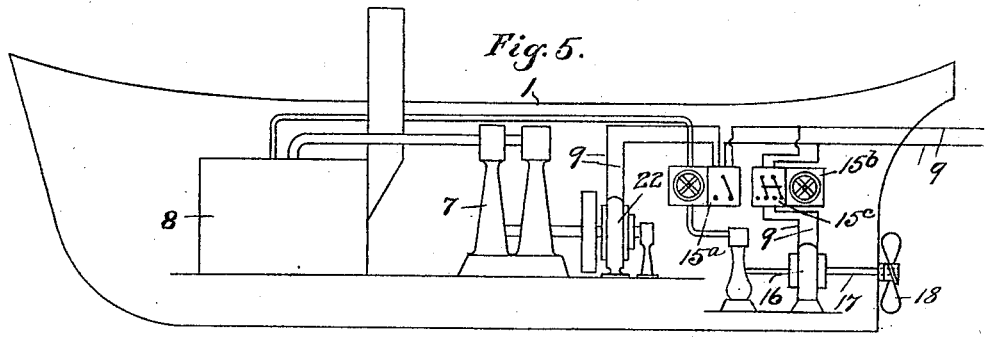
Witnesses
Geo. W. Eisenbraun
Geo. C. Billard
Inventor
William T. Donnelly
By his Attorneys
Blackwood Bros.

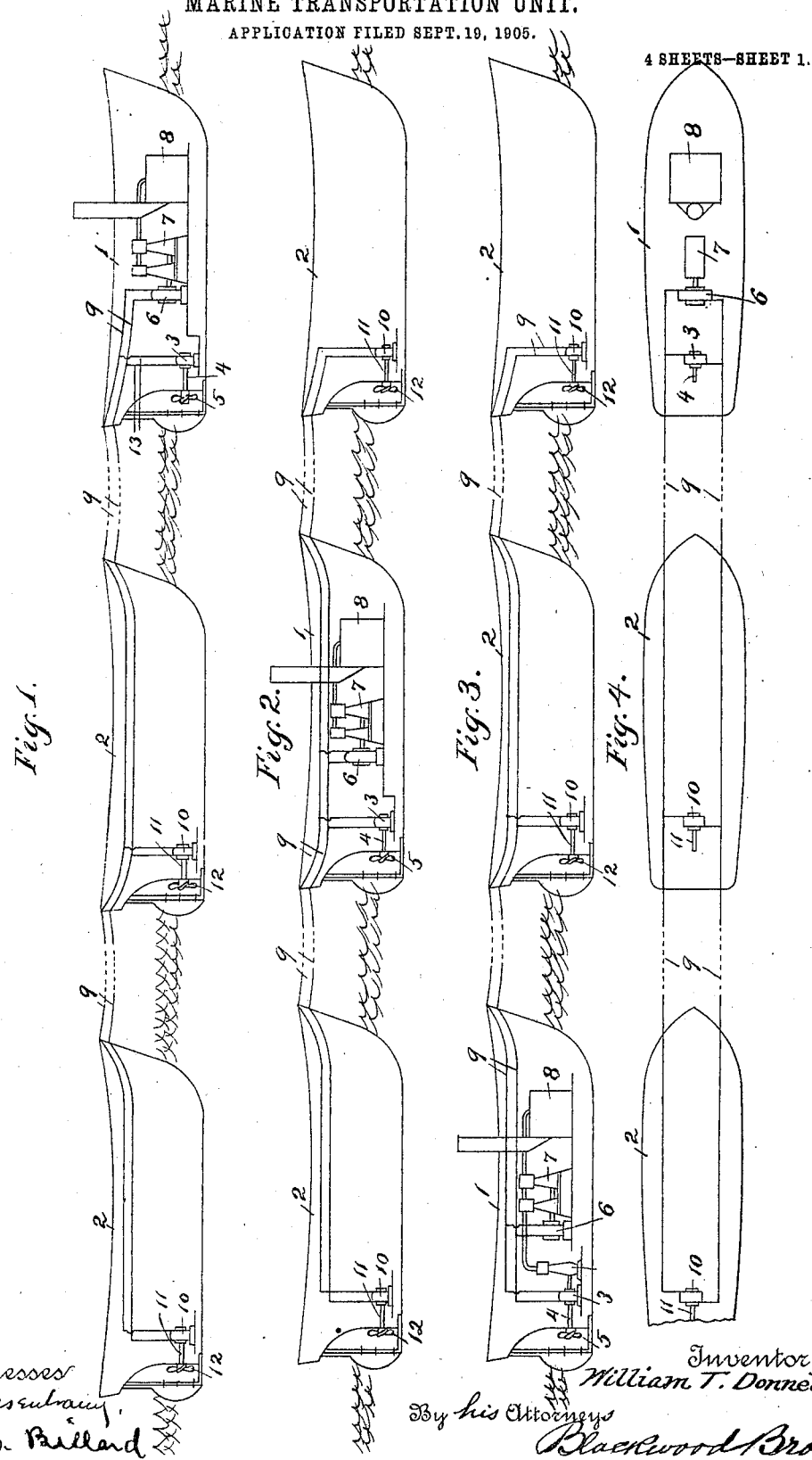

No. 805,268. PATENTED NOV. 21, 1905.
W. T. DONNELLY.
MARINE TRANSPORTATION UNIT.
APPLICATION FILED SEPT. 19, 1905.
4 SHEETS—SHEET 3.
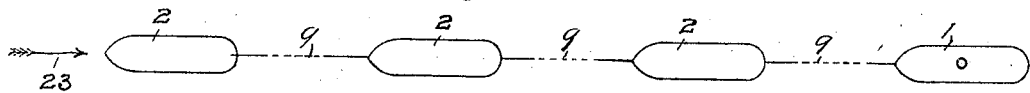
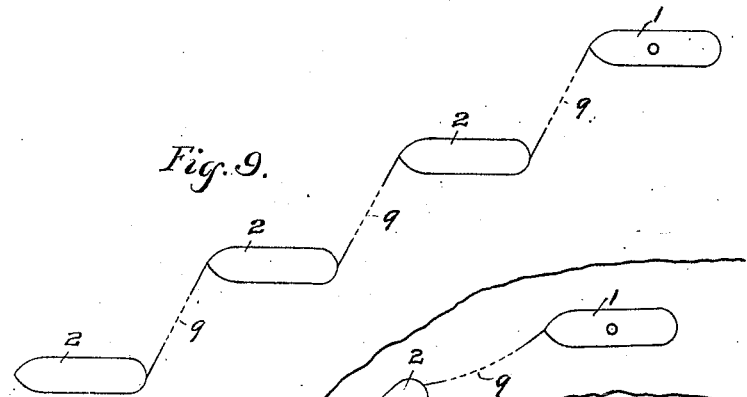
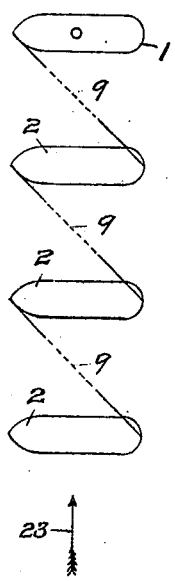

No. 805,268. PATENTED NOV. 21, 1905.
W. T. DONNELLY.
MARINE TRANSPORTATION UNIT.
APPLICATION FILED SEPT. 19, 1905.
4 SHEETS—SHEET 4.
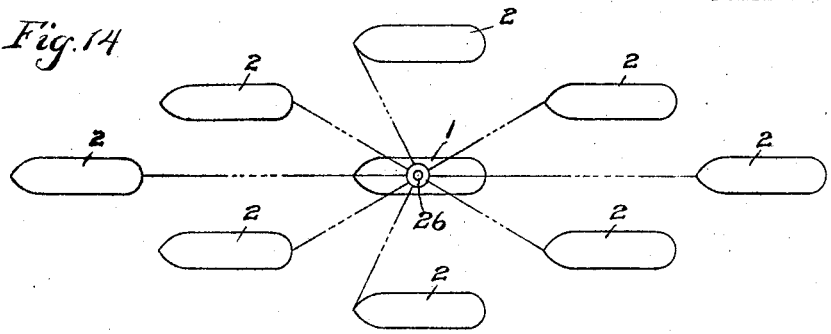
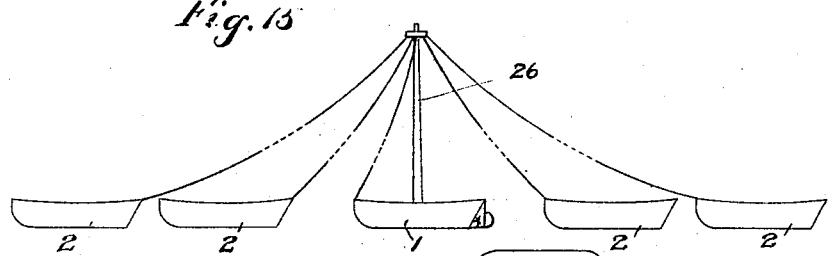
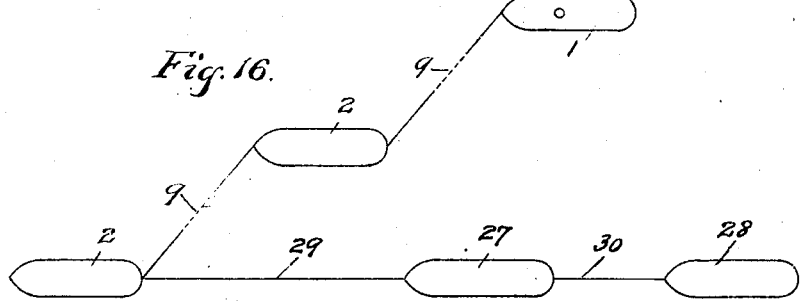
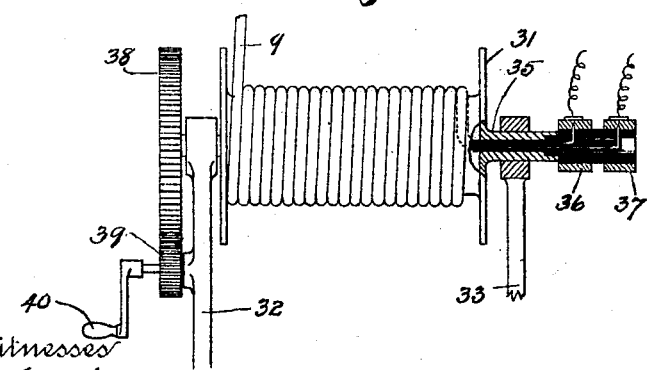
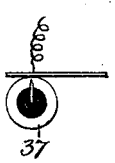
Witnesses
Geo W Eisenbaum
Geo. C. Billard
Inventor
William T. Donnelly
By his Attorneys
Blackwood Bros

UNITED STATES PATENT OFFICE.

WILLIAM THOMAS DONNELLY, OF BROOKLYN, NEW YORK.

MARINE TRANSPORTATION UNIT.

No. 805,268.  Specification of Letters Patent.  Patented Nov. 21, 1905.

Application filed September 19, 1905. Serial No. 279,088.

*To all whom it may concern:*

Be it known that I, WILLIAM THOMAS DONNELLY, a citizen of the United States, residing at Brooklyn, in the county of Kings and State of New York, have invented certain new and useful Improvements in Marine Transportation Units, of which the following is a specification.

My invention relates to a marine transportation unit composed of a fleet or convoy of vessels for the transportation of merchandise and passengers upon navigable waters.

My invention particularly relates to a system of supplying power of propulsion to the vessels forming the fleet in such a manner that while receiving the power from a common source they are free to independently use the power to navigate as regards wind, weather, and local obstructions upon the general course the fleet or convoy is steering.

Heretofore vessels have been propelled individually by the power of the wind or by means of some mechanical power, such as a steam-engine or a gas or explosive engine; also, by electricity generated from a battery, when propelled in a group by power from a common source, they have been towed by a tow-line connecting all the members of the tow-fleet to the tow vessel or common source of power, or they have been so closely bound together by ropes that they formed a sufficiently rigid structure to permit shoving from behind. In both of these methods the independent navigation of the individual vessels is entirely eliminated and each is compelled to maintain the same relative position to the others at all times and to proceed at only such speed as is determined by the towing or pushing vessel.

My invention provides for the generation of propelling power, such as electricity, upon one of a fleet or convoy of vessels that are sailing the same general course and its distribution to the other vessels in such a manner that they will be free to make use of it for propulsion and at the same time be free to navigate independently in the vicinity of the fleet as regards speed, wind, and weather and the avoidance of local obstructions.

Referring to the accompanying drawings, Figures 1, 2, and 3 each show a side view of a fleet of vessels illustrating my invention; Fig. 4, a plan view of the same. Figs. 5, 6, and 7 each show a side view, on an enlarged scale, of a vessel with a different form of power-generating plant. Figs. 8, 9, 10, 11, 12, and 13 are diagrammatic views of different groupings of vessels proceeding under my system of propulsion. Figs. 14, 15, and 16 are further diagrammatic views showing other variations of the system. Figs. 17 and 18 are detail views showing the device for changing the length of the electric conductor between the vessels without interrupting the current; Fig. 19, a cross-section of the electric conductor and cable.

In the drawings, in which like numerals of reference denote like parts throughout the several views, 1 represents in all the figures the vessel upon which the power-generating plant is located; 2, the vessels of the fleet or convoy.

The vessel 1, on which the power-generating plant is located, is shown in Figs. 1, 2, and 4 as provided with a motor 3, on the shaft 4 of which is mounted a propeller 5, a dynamo 6 furnishing power for operating said propeller, a steam-engine 7 for driving the dynamo, and a steam-boiler 8 for furnishing power for operating the steam-engine. The dynamo 6 on vessel 1, being connected in circuit with the motor 3 by electric conductors 9, transmits electricity to the motors 10 of the other vessels 2 of the fleet, which operate propellers 12 through the shafts 11. The conductors 9 are partly indicated in dotted lines to indicate that they can be extended to a length sufficient to admit of the independent movement of the different vessels.

The vessels in Fig. 3 are similar to the vessels shown in Figs. 1, 2, and 4, except that the vessel 1 is shown as provided with a steam-engine 7, coupled to the propeller-shaft 4, as well as a motor 3, for the purpose of adapting the vessel to be operated either by electricity or steam.

In Fig. 5 the power-generating vessel is shown, power being generated from coal through the steam-boiler 8, changed into mechanical energy by a steam-engine 7, transformed into electricity by the dynamo 22, and distributed to the propelling apparatus of the various vessels by the conductors 9.

In Fig. 6 power is generated on the power-generating vessel shown by means of a gas-producer plant 13, which operates the dynamo 15, which generates electricity led by the conductors 9 to the motor 16, operating the shaft 17 and propeller 18, and also similar motors, with their equipments, upon any other vessels to which the conductors may be led. Upon the main circuit from the dynamo or generator 15 is provided a cut-out and controller 15ª for electrically disconnecting all the motors, and upon the branch circuit to each motor a controller 15ᵇ is provided for regulating the speed of each motor independently and also a reversing pole-switch 15ᶜ for operating the motor in the reverse direction and a cut-out switch for stopping.

In Fig. 7 a similar power-generating vessel to the one described in Fig. 6 is shown; but the power is derived from naphtha or other light hydrocarbon carried in the tank 19, the naphtha being changed into mechanical power in the explosive-engine 21 and changed into electric energy by the dynamo 22 and distributed and used as previously described.

In Figs. 8, 9, and 10 the different relative positions which the vessels of a fleet may assume while under way to best meet the conditions of changing weather and wind are shown, the arrows 23 indicating the direction from which the wind is supposed to be blowing. In Fig. 8 the vessels are in line one behind the other to meet a head wind, and the vessel furnishing the propelling power is the last in the line. In Fig. 9 the wind is supposed to be blowing on the port bow and the following vessels have so changed their relative positions as to retain the advantage of being to leeward of the leading vessel while maintaining the same general course. In Fig. 10 the wind is supposed to be blowing on the port beam and the following vessels have all moved up abeam of the leading vessel and to leeward. It will be understood that while thus proceeding the electric conductors 9, connecting the vessels for the transmission of power, are not subjected to any greater strain than is due to their own weight, and consequently the different vessels are free to independently steer their own course. It will also be understood that the leading or weather vessel in each of the foregoing cases will be subjected to more severe weather conditions than the others of the fleet, and consequently with the same amount of propelling power would be unable to maintain the same speed as the others, and it is one of the objects of my invention to provide for this by having electric controllers in the circuits of the various motors by which the total amount of power available at any time will be so distributed to the various vessels of the fleet as to give to all the maximum uniform speed attainable under the existing conditions.

In Fig. 11 is shown the manner in which a fleet of vessels can navigate around an abrupt bend of a narrow channel or river without interfering with one another. The arrow 24 indicates the direction in which the fleet is proceeding, and it is apparent that it would be impossible for a fleet of vessels to proceed in an ordinary tow around a short bend in a narrow channel, as here shown, as the strain on the tow-lines would always tend to pull the vessels into a straight line and result in the intermediate vessels grounding or coming in contact with the shore on the inner side of the turn. By means of my invention all the vessels are able to proceed at maximum speed and steer an independent course around the bend, the conductors 9 hanging loosely between them.

In Figs. 12 and 13 is shown the manner in which the fleet may proceed while the propelling machinery of the power-generating vessel 1 is out of order for repairs or other cause. In these figures the vessels 2 of the fleet all being shown as attached by tow-lines to the power-generating vessel 1, which is still furnishing power to the other vessels, the speed of the fleet is reduced only slightly.

In Figs. 14 and 15 a modification is shown of the manner of attaching the fleet to the power-generating vessel for the distribution of propelling power. The power-conductors in this case are led from an elevated point upon the power-generating vessel, such as a mast or spar 26, and by this means great latitude of independent movement may be given to each vessel.

In Fig. 16 is shown the manner by which any one of the power-propelled vessels of the fleet may act as a tow vessel, the numerals 27 and 28 indicating ordinary vessels that are being towed by one of the vessels 2 by means of tow-lines 29 and 30.

In Fig. 17 is shown the device by which I am enabled to change the length of the electric-power conductor between the vessels without interrupting the current. In this figure, 31 is a winding-drum mounted between the standards 32 and 33, designed to be attached to a vessel, and upon this drum is wound the power-conducting cables or conductors 9, the free end of which is carried to the vessel or vessels to which power is being furnished, the other end passing to the interior of the drum and through the hollow trunnion 35, and beyond the trunnion the conductors are separated and attached to separate conducting-rings 36 and 37, insulated from each other and from the drum. From these the current is led to and from the generator in the usual way. Upon the opposite end of the drum-shaft is mounted a large gear 38, which is engaged by the pinion 39, operated by hand-crank 40, and by means of this construction it will be seen that the electric conductor can be wound upon or unwound from the drum without interrupting the current. I have shown the two conductors as being carried in one cable, it being understood that they are electrically insulated from each other; but two drums might be provided, each to receive a separate conductor.

If found desirable, the vessels may be connected together by a rope or cable 9ª, as shown in cross-section in Fig. 19.

I do not wish to be understood as limiting myself to the specific details of construction and arrangement as herein described and illustrated, as it is manifest that variations and modifications may be made in the features of construction and arrangement on the adaptation of the device to various conditions of use without departing from the spirit and scope of my invention and improvements. I therefore reserve the right to all such variations and modifications as properly fall within the scope of my invention and the terms of the following claims.

What I claim is—

1. A marine transportation unit comprising a plurality of independent vessels free to navigate relative to each other and each having means for power propulsion and steering means and all being connected together for the transmission of electric power, and a common source of electric power for propelling all the vessels, substantially as described.

2. A marine transportation unit comprising a plurality of independent vessels free to navigate relative to each other and each having means for electric power propulsion and steering means, a source of power upon one of them and means for transmitting said power to all the vessels, substantially as described.

3. A marine transportation unit comprising a plurality of vessels each having independent steering means and independent propelling means and a common source of electric power upon one of the vessels for operating the propelling means of all the vessels, substantially as described.

4. A marine transportation unit comprising a plurality of vessels, one of said vessels having propelling means, steering means and an electric generating plant for operating the propelling means, and each of the other vessels having independent steering means and independent propelling means operated by electric power supplied from the generating plant of the first-mentioned vessel, substantially as described.

5. A marine transportation unit comprising a plurality of independent vessels free to navigate relative to each other and each provided with mechanism for power propulsion and steering means, a source of electric-power supply upon one of them, means for distributing said power to the propelling mechanism of each and means for controlling the speed of each vessel independently of the others, substantially as described.

6. A marine transportation unit comprising a plurality of vessels connected for the transmission of electric power, steering and propelling means for utilizing said power on each of said vessels and a common source of electricity carried by one of said vessels, substantially as described.

7. A marine transportation unit comprising a plurality of vessels free to navigate relative to each other and each having means for power propulsion and steering means and all being connected for the transmission of electric power, a common source of electric power upon one of the vessels for propelling all the vessels and means regulating the amount of said power supplied to the various vessels so as to give all of said vessels a uniform speed, substantially as described.

8. A marine transportation unit comprising a plurality of vessels each having independent steering means and independent propelling means, means connecting said vessels adapted for the transmission of electric power, means for varying the length of said connecting means and electric-power-generating means upon one of the vessels for operating the propelling means of each vessel, substantially as described.

9. A marine transportation unit comprising a plurality of vessels each having independent steering means and independent propelling means, means connecting said vessels adapted for the transmission of electric power, electric-power-generating means upon one of the vessels for operating the propelling means of each vessel and means for controlling the distribution of said power to the propelling means of each vessel, substantially as described.

In testimony whereof I have signed my name to this specification in the presence of two subscribing witnesses.

WILLIAM THOMAS DONNELLY.

Witnesses:
HARRY A. STEVENS,
JAMES A. DONNELLY.